Aug. 24, 1926.
S. W. LOMBARD
1,596,981
LOCKING DEVICE FOR GEAR SHIFTING MEMBERS
Filed March 18, 1926
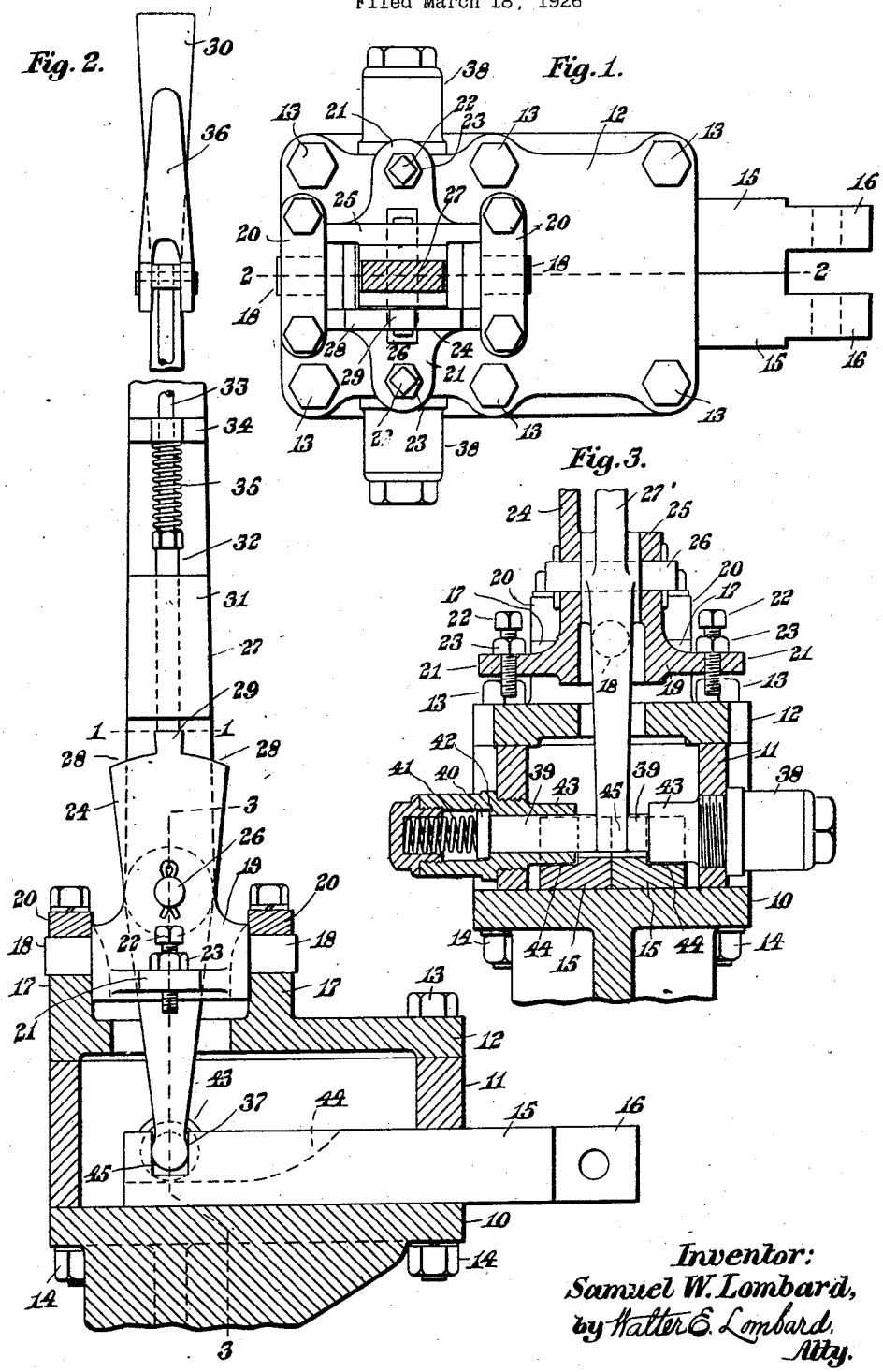
Inventor:
Samuel W. Lombard,
by Walter E. Lombard,
Atty.

Patented Aug. 24, 1926.

1,596,981

UNITED STATES PATENT OFFICE.

SAMUEL W. LOMBARD, OF WATERVILLE, MAINE, ASSIGNOR TO LOMBARD TRACTION ENGINE CO., OF WATERVILLE, MAINE, A CORPORATION OF MAINE.

LOCKING DEVICE FOR GEAR-SHIFTING MEMBERS.

Application filed March 18, 1926. Serial No. 95,796.

This invention relates to locking devices for gear shifting members and has for its object the production of a simple but effective device of this character which will lock the gear shifting members either in neutral position or in shifted position to attain a desired speed.

This object is attained by the mechanism illustrated in the accompanying drawings. For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a horizontal section on line 1, 1 on Fig. 2 of a locking mechanism embodying the principles of the present invention.

Figure 2 represents a vertical section of same on line 2, 2 on Fig. 1, and

Figure 3 represents a vertical section of same on line 3, 3 on Fig. 2.

Similar characters indicate like parts throughout the several figures of the drawings.

In the drawings, 10 is a support having a casing 11 secured thereto, this casing 11 and a top plate 12 therefor being secured to said support by bolts 13 and nuts 14.

Through bearings in one end wall of the casing 10 extend reciprocating members 15, the outer ends 16 thereof being provided with means for attaching to devices for shifting the gears in the gear casing of an automobile or similar structure.

As the gear shifting mechanism itself forms no part of the present invention it is deemed unnecessary to illustrate the same in detail.

Extending upwardly from the top plate 12 are blocks 17 having bearings therein for trunnions 18 formed upon a tilting member 19, these blocks 17 having caps 20 secured thereto to prevent the displacement of the trunnions 18 from their bearings.

The tilting member 19 has oppositely disposed ears 21 extending laterally therefrom in each of which is threaded an adjusting screw 22 having a nut 23 thereon.

These screws 22 may be adjusted and secured in adjusted position by the clamping nuts 23 so that when the lower ends of the screw 22 strike the upper face of the top plate 12 the tilting of the member 19 may be limited.

The tilting member 19 has extending upwardly therefrom a plate 24 and parallel thereto and spaced therefrom an ear 25.

Mounted in the ear 25 and plate 24 is a pivoted pin 26 on which is mounted a lever 27.

The upper end of the plate 24 is concentric at 28 with the axis of the pin 26 and extending from the center of said upper end is a projection 29.

The lever 27 is provided with a handle 30 by which it may be manipulated either to move it about the axis of the pin 26 or to move it with the tilting member 19 about the axis of the trunnions 18.

In a projection 31 on one side of the lever 27 is mounted a reciprocating member 32 having a rod 33 extending upwardly therefrom through a bearing 34.

Surrounding the rod 33 between the bearing 34 and the upper end of the member 32 is a spring 35 adapted to force said member 32 downwardly into contact with the upper end of the projection 29 when the parts are in the position indicated in Fig. 2 of the drawing.

This position of the parts as indicated in said Fig. 2 is the neutral position of the lever 27.

When the gears are out of commission should the lever 27 be moved about the axis of the pin 26 to the right or to the left the expansion of the spring 35 will force the member 32 downwardly against the curved surface 28 and lock said lever preventing its return to the neutral position shown in the drawings.

Secured to the upper end of the lever 27 adjacent the handle 30 is a pivoted lever 36 to which the upper end of the rod 33 is secured.

By pressing upon this lever while grasping the handle 30 the member 32 may be raised so that its lower end extends above the projection 29, thereby permitting the lever to be returned to its neutral position.

Each of the reciprocating members 15 have square notches 37 formed therein, these notches being in alinement when the members 15 are in their normal position.

Opposite the notches 37 and threaded to the walls of the casing 11 are housings 38 in which are mounted bolts 39, the inner end of each of which extends partially through one of the notches 37 in the reciprocating members 15.

Each bolt 39 has a head 40 pressed by means of a spring 41 within the housing 38 against a shoulder 42 formed in said housing and thereby limiting the movement of each bolt 39.

Each housing 38 has a cylindrical hub 43 extending over a portion of each reciprocating member 15, said member being cut away as at 44 to accommodate said cylindrical hub and permit the reciprocation of the member 15.

The lever 27 extends downwardly from the pin 26 and has a rounded lower end 45 which is interposed between the inner ends of the bolts 39, this rounded end 45 being disposed partly in each of the notches 37 when the lever is in its neutral position.

When one of the members 15 is moved in one direction it will shift the gears in the gear casing to attain one speed and when moved in the opposite direction a different speed will be obtained, while another speed may be obtained by a movement of the other movement 15 in one direction, a reversing of the gears being when this other member 15 is moved in the opposite direction.

When it is desired to move one of the members 15 in order to obtain a shifting of the gears, the handle 30 is grasped and moved so that the member 19 is tilted about the axis of the trunnions 18.

This tilting movement will cause the rounded end 45 of the lever 27 to force the bolt 39 inwardly against the tension of the spring 41 so that the entire lower end 45 will be disposed in one of the notches 37 and free from the other notch 37.

When the member 19 has been thus tilted the lever 27 may then be moved in either direction about the axis of the pin 26 and cause an end movement of one of the members 15.

When this movement has been completed the member 32 will be forced downwardly so that it will contact with one side face of the projection 29 and lock the lever so that it cannot return to its neutral position, and consequently the rounded end 45 still being in the notch 37 the member 15 is locked so that no further end movement may occur until the operator raises the member 32 and returns the lever 27 into the position indicated in Fig. 2.

While one member 15 is being moved endwise to shift one set of gears the bolt 39 in the notch of the other member prevents any end movement of that particular member.

When the lever 27 is in its normal position the projecting ends of the two bolts 39 in the notches of both members 15 prevent any end movement of either of these members.

In other words, the gears are locked securely when in neutral position by the bolts 39 and neither of the gear shifting members 15 can be moved endwise until the lever 27 is tilted about the trunnions 18 and moved about the pin 26, and when a member 15 has been once moved endwise to secure a shifting of the gears, this member will be locked securely from further movement until the operator releases the member 32 from contact with the projection 29.

This makes a very effective device for preventing accidental movement of the gears in a gear casing and locking either set of gears in commission so that they cannot be accidentally disengaged.

It is believed that with the explanation herewith given the operation and many advantages of the invention will be thoroughly understood.

Having thus described my invention, I claim—

1. A locking device for gear-shifting mechanism consisting of two parallel rectangular bars slidable in contact with each other and each provided with a transverse notch in its upper side, and having one end extending beyond the casing with means thereon for attaching a gear-shifting means thereto, a spring-pressed bolt extending partly through each notch, a lever movable about pivots perpendicular to each other and having its lower end interposed between said bolts and adapted when moved laterally about one pivot to force either bolt from the notch in which it is normally positioned and adapted when moved about the other pivot to move endwise the released bar, and means coacting with the upper end of said lever for locking it when said released bar is in its adjusted position.

2. A locking device for gear-shifting mechanism consisting of two parallel reciprocating bars contacting with each other and each provided with a transverse notch in its upper side, said notches being alined under normal conditions and each bar having one end extending beyond the casing and adapted to have a gear-shifting member attached thereto, a spring-pressed bolt extending partly through each notch, a lever movable about two pivots perpendicular to each other and having its lower end interposed between said bolts and adapted in its lateral movement to force either bolt from the notch in which it is normally positioned and in its other movement to move the released bar endwise, and means coacting with the upper end of said lever for locking it when the released bar is in its adjusted position.

3. A locking device for gear-shifting mechanism consisting of two parallel reciprocating bars each provided with a transverse notch, said notches being normally in alinement, a casing provided at one end with a single bearing in which both bars slide in contact with each other, housings threaded to said casing on opposite sides of said bars and alined with said notches, the inner ends of said housings extending into recesses cut in the sides of said bars and acting as guides therefor, spring-pressed bolts in said housings each having an end projecting partly through the notch of one bar, a lever movable about two pivots perpendicular to each other with its lower end interposed between said bolts and adapted when moved laterally in either direction about one pivot to remove one of said bolts from the notch in one bar and release it and when moved about the other pivot to reciprocate the released bar, and means coacting with the upper end of said lever for locking it when the released bar is in its adjusted position.

4. A locking device for gear-shifting mechanism consisting of two parallel reciprocating bars slidable in contact with each other and each provided with a transverse notch, a spring-pressed bolt extending partly through each notch, a casing for said bars and bolts having a single bearing at one end in which both bars slide, alined bearings on said casing parallel with said bars, a member pivoted in said bearings and having a pivot pin perpendicular to said bearings, and a lever on said pivot pin having its lower end interposed between said bolts.

5. A locking device for gear-shifting mechanism consisting of two parallel reciprocating bars slidable in contact with each other and each provided with a transverse notch, a spring-pressed bolt extending partly through each notch, a casing for said bars and bolts having a single bearing at one end in which both bars slide, alined bearings on said casing parallel with said bars, a member pivoted in said bearings and having a pivot pin perpendicular to said bearings, means for limiting the movement of said member about its pivot, and a lever on said pivot pin having its lower end interposed between said bolts.

6. A locking device for gear-shifting mechanism consisting of two parallel reciprocating bars each provided with a transverse notch, a spring-pressed bolt extending partly through each notch, a casing for said bars and bolts, alined bearings on said casing, a member pivoted in said bearings and having a pivot pin perpendicular to said bearings, adjustable members for limiting the movement of said member about its pivot, and a lever on said pivot pin having its lower end interposed between said bolts.

7. A locking device for gear-shifting mechanism consisting of two parallel reciprocating bars each provided with a transverse notch, a spring-pressed bolt extending partly through each notch, a casing for said bars and bolts, alined bearings on said casing, a member pivoted in said bearings and having a pivot pin perpendicular to said bearings, a lever on said pivot pin having its lower end interposed between said bolts, and means for locking said lever to said pivoted member.

8. A locking device for gear-shifting mechanism consisting of two parallel reciprocating bars each provided with a transverse notch, a spring-pressed bolt extending partly through each notch, a casing for said bars and bolts, alined bearings on said casing, a member pivoted in said bearings and having a pivot pin perpendicular to said bearings, said member having a vertical extension provided with a central projection at its upper end, a lever on said pivot pin having its lower end interposed between said bolts, and a spring-pressed member on said lever adapted to engage one side of said projection when a bar has been moved in either direction.

9. A locking device for gear-shifting mechanism consisting of two parallel reciprocating bars each provided with a transverse notch, a spring-pressed bolt extending partly through each notch, a casing for said bars and bolts, alined bearings on said casing, a member pivoted in said bearings and having a pivot pin perpendicular to said bearings, said member having a vertical extension provided with a central projection at its upper end, a lever on said pivot pin having its lower end interposed between said bolts, a spring-pressed member on said lever adapted to engage one side of said projection when a bar has been moved in either direction, and means for disengaging said spring pressed member from said projection.

Signed by me at Waterville, Maine, this 11 day of February, 1926.

SAMUEL W. LOMBARD.